(12) United States Patent
Okuda et al.

(10) Patent No.: US 12,407,496 B2
(45) Date of Patent: Sep. 2, 2025

(54) PROGRAM EXECUTION SYSTEM, DATA PROCESSING APPARATUS, PROGRAM EXECUTION METHOD AND PROGRAM

(71) Applicant: NIPPON TELEGRAPH AND TELEPHONE CORPORATION, Tokyo (JP)

(72) Inventors: Tetsuya Okuda, Tokyo (JP); Koji Chida, Tokyo (JP); Yuichiro Dan, Tokyo (JP); Ryohei Suzuki, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 172 days.

(21) Appl. No.: 18/249,659

(22) PCT Filed: Nov. 13, 2020

(86) PCT No.: PCT/JP2020/042532
§ 371 (c)(1),
(2) Date: Apr. 19, 2023

(87) PCT Pub. No.: WO2022/102108
PCT Pub. Date: May 19, 2022

(65) Prior Publication Data
US 2023/0396415 A1  Dec. 7, 2023

(51) Int. Cl.
*H04L 9/08* (2006.01)
*G06F 21/12* (2013.01)

(52) U.S. Cl.
CPC ............ *H04L 9/0825* (2013.01); *G06F 21/12* (2013.01)

(58) Field of Classification Search
CPC .............................. H04L 9/0825; G06F 21/12
(Continued)

(56) References Cited

U.S. PATENT DOCUMENTS 6,986,044 B1 * 1/2006 Inada .................... H04L 9/3247
                                                             713/183
10,956,585 B2 * 3/2021 Ortiz ................... G06F 21/6245
(Continued)

FOREIGN PATENT DOCUMENTS

JP         2001353678 A * 12/2001 ........... G06F 3/0481
WO       2019/227208    12/2019

OTHER PUBLICATIONS

Microsoft Azure Confidential Computing Official Web Page https://docs.microsoft.com/ja-jp/azure/confidential-computing/overview, Aug. 23, 2022.
(Continued)

*Primary Examiner* — Samson B Lemma
(74) *Attorney, Agent, or Firm* — IPUSA, PLLC (57) ABSTRACT

A program execution system includes a data holding apparatus, a program providing apparatus, and a data processing apparatus that performs computing in a secure region. The data holding apparatus transmits encrypted data, encrypted with a first common key, to the data processing apparatus, and the program providing apparatus transmits an encrypted program, encrypted with a second common key, to the data processing apparatus. In the secure region, the data processing apparatus acquires data by decrypting the encrypted data with the first common key, acquires a program by decrypting the encrypted program with the second common key, executes the program for the data, and encrypts a result of the execution with a public key of the data holding apparatus or the first common key. The data holding apparatus acquires the result of the execution by decrypting the encrypted result of the execution with a secret key or the first common key.

6 Claims, 7 Drawing Sheets

(58) Field of Classification Search
USPC .......................................................... 713/171
See application file for complete search history.

(56) References Cited

U.S. PATENT DOCUMENTS

| | | | | |
|---|---|---|---|---|
| 11,626,976 | B2* | 4/2023 | Imabayashi | G06F 21/6218 713/171 |
| 2003/0126458 | A1* | 7/2003 | Teramoto | G06F 12/1466 713/194 |
| 2008/0046763 | A1* | 2/2008 | Teramoto | G06F 12/1466 713/194 |
| 2008/0084998 | A1* | 4/2008 | Kontani | G11B 20/00173 380/46 |
| 2009/0016537 | A1* | 1/2009 | Ju | H04N 21/25816 380/278 |
| 2009/0225988 | A1* | 9/2009 | Yamazaki | H04L 9/0825 380/278 |
| 2010/0195830 | A1* | 8/2010 | Kubotera | H04L 9/3073 380/255 |
| 2013/0151846 | A1* | 6/2013 | Baumann | H04L 9/3263 713/168 |
| 2016/0218864 | A1* | 7/2016 | Mutou | G06F 21/602 |
| 2019/0362083 | A1* | 11/2019 | Ortiz | H04L 9/3247 |
| 2020/0125772 | A1* | 4/2020 | Volos | H04L 9/3265 |
| 2022/0092207 | A1* | 3/2022 | Ozaki | H04L 9/0625 |
| 2022/0303249 | A1* | 9/2022 | Imabayashi | H04L 9/008 |
| 2022/0385455 | A1* | 12/2022 | Imabayashi | G06F 21/602 |

OTHER PUBLICATIONS

Google Confidential VM Official Web Page https://cloud.google.com/compute/confidential-vm/docs?hl=ja, Jul. 2022.
Andreas Fischer et al., "Computation on Encrypted Data using Data Flow Authentication", Arxiv. Org, Cornell University Library, 201 Olin Library Cornell University Ithaca, NY 14853, Oct. 1, 2017 (Oct. 1, 2017), XP080825137.

* cited by examiner

PROGRAM EXECUTION SYSTEM, DATA PROCESSING APPARATUS, PROGRAM EXECUTION METHOD AND PROGRAM

TECHNICAL FIELD

The present invention relates to a confidentiality protection technology in the information and communication fields.

BACKGROUND ART

Examples of conventional techniques for performing computing while keeping data and programs secret from cloud providers include Confidential Computing (Non Patent Literature 1) and Confidential VM (Prior Art Literature 2). By these techniques, it is possible to isolate and keep highly confidential data secret while processing the data in a cloud, for example.

However, these conventional techniques do not take into consideration the risk that data and programs leak to each other user in a case where different users hold the data and programs.

CITATION LIST

Non Patent Literature

Non Patent Literature 1: Microsoft Azure Confidential Computing Official Web Page https://docs.microsoft.com/ja-jp/azure/confidential-computing/overview Non Patent Literature 2: Google Confidential VM Official Web Page https://cloud.google.com/compute/confidential-vm/docs?hl=ja

SUMMARY OF INVENTION

Technical Problem

The present invention has been made in view of the above aspects, and aims to provide a technology for preventing data leakage to the program provider and program leakage to the data holder in a case where a data processing apparatus having a confidential computing mechanism processes data held by the data holder according to a program provided by the program provider.

Solution to Problem

The technology disclosed herein provides a program execution system that includes a data holding apparatus, a program providing apparatus, and a data processing apparatus having a mechanism that performs secret computing in a secure region,
in which
the data holding apparatus transmits encrypted data to the data processing apparatus, and the program providing apparatus transmits an encrypted program to the data processing apparatus, the encrypted data being encrypted with a first common key, the encrypted program being encrypted with a second common key,
in the secure region, the data processing apparatus acquires data by decrypting the encrypted data with the first common key, acquires a program by decrypting the encrypted program with the second common key, executes the program for the data, and encrypts a result of the execution with a public key of the data holding apparatus or the first common key,
the data processing apparatus transmits the encrypted result of the execution to the data holding apparatus, and
the data holding apparatus acquires the result of the execution by decrypting the encrypted result of the execution with a secret key or the first common key.

Advantageous Effects of Invention

The technology disclosed herein provides a technology for preventing data leakage to the program provider and program leakage to the data holder in a case where a data processing apparatus having a confidential computing mechanism processes data held by the data holder according to a program provided by the program provider.

DESCRIPTION OF EMBODIMENTS

In the description below, an embodiment of the present invention (the present embodiment) will be explained with reference to the drawings. The embodiment described below is merely an example, and embodiments to which the present invention is applied are not limited to the following embodiment. Note that, in the description below, a program is denoted by P, data to be processed according to P is denoted by D, and a result of processing of D according to P is denoted by P(D).

(System Configuration)

Figure 1:
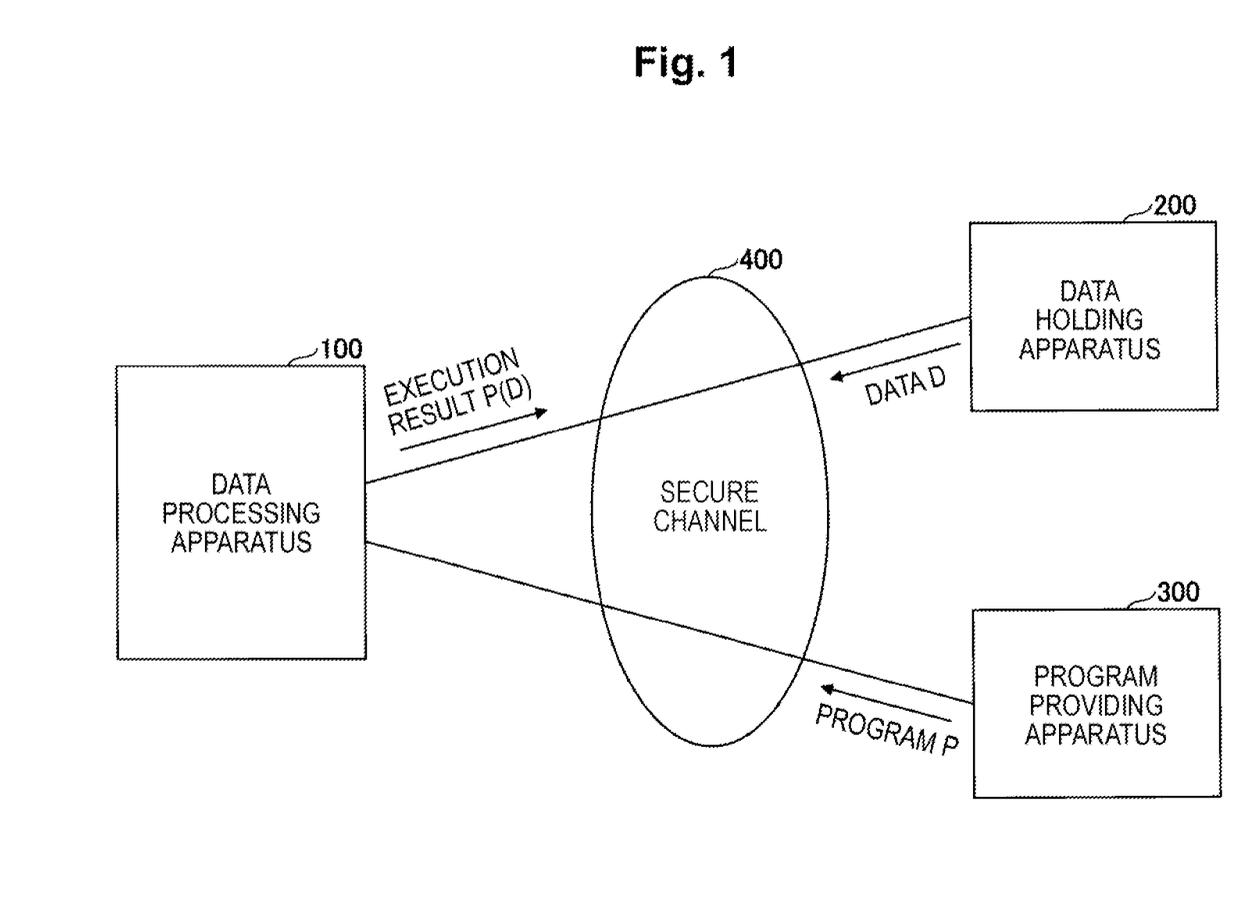
FIG. 1 is a system configuration diagram according to an embodiment of the present invention.

FIG. 1 illustrates an example configuration of a program execution system according to an embodiment of the present invention. As illustrated in FIG. 1, the program execution system according to the present embodiment includes a data processing apparatus 100, a data holding apparatus 200, and a program providing apparatus 300.

Each of the data processing apparatus 100, the data holding apparatus 200, and the program providing apparatus 300 may be a physical machine (a computer), or may be a virtual machine in a cloud. Alternatively, each of the data holding apparatus 200 and the program providing apparatus 300 may be a function (a web browser, for example) that operates in a physical machine or a virtual machine.

In the present embodiment, the data processing apparatus 100 has a trusted execution environment (TEE) function (which may be referred to as a secret computing mechanism or a confidential computing mechanism) that performs data processing separately from an existing OS. In the present embodiment, SGX of Intel (registered trademark) is assumed as this function, for example. However, this is merely an example, and the present invention can be applied to any TEE function. For example, the present invention can also be applied to SEV of AMD (registered trademark), TrustZone (registered trademark) of Arm (registered trademark), and the like.

As illustrated in FIG. 1, a secure channel 400 is constructed between the data processing apparatus 100 and the data holding apparatus 200, and between the data processing apparatus 100 and the program providing apparatus 300, and data and programs can be safely transmitted and received. For example, this secure channel is constructed by a remote authentication protocol called Remote Attestation in SGX. However, this is merely an example, and the secure channel may be constructed by any means.

In the present embodiment, a program P is transmitted from the program providing apparatus 300 to the data processing apparatus 100, data D is transmitted from the data holding apparatus 200 to the data processing apparatus 100, and the data processing apparatus 100 processes the data D according to the program P, and provides an execution result P(D) to the data holding apparatus 200.

With its secret computing mechanism, the data processing apparatus 100 does not leak the program P and the data D to the outside of the secure region (for example, to a cloud in which the data processing apparatus 100 is operating). The present embodiment provides not only this mechanism, but also a mechanism in which the program P does not leak to the data holding apparatus 200, and the data D does not leak to the program providing apparatus 300.

Thus, in the program execution system according to the present embodiment, in a use case where the secret computing mechanism is applied to data distribution, the data holder (the data holding apparatus 200) having the highly confidential data D and the program author (the program providing apparatus 300) having the highly confidential program P can combine and execute the data and the program while keeping the data and the program secret from each other.

Example Configuration of the Data Processing Apparatus

Figure 2:
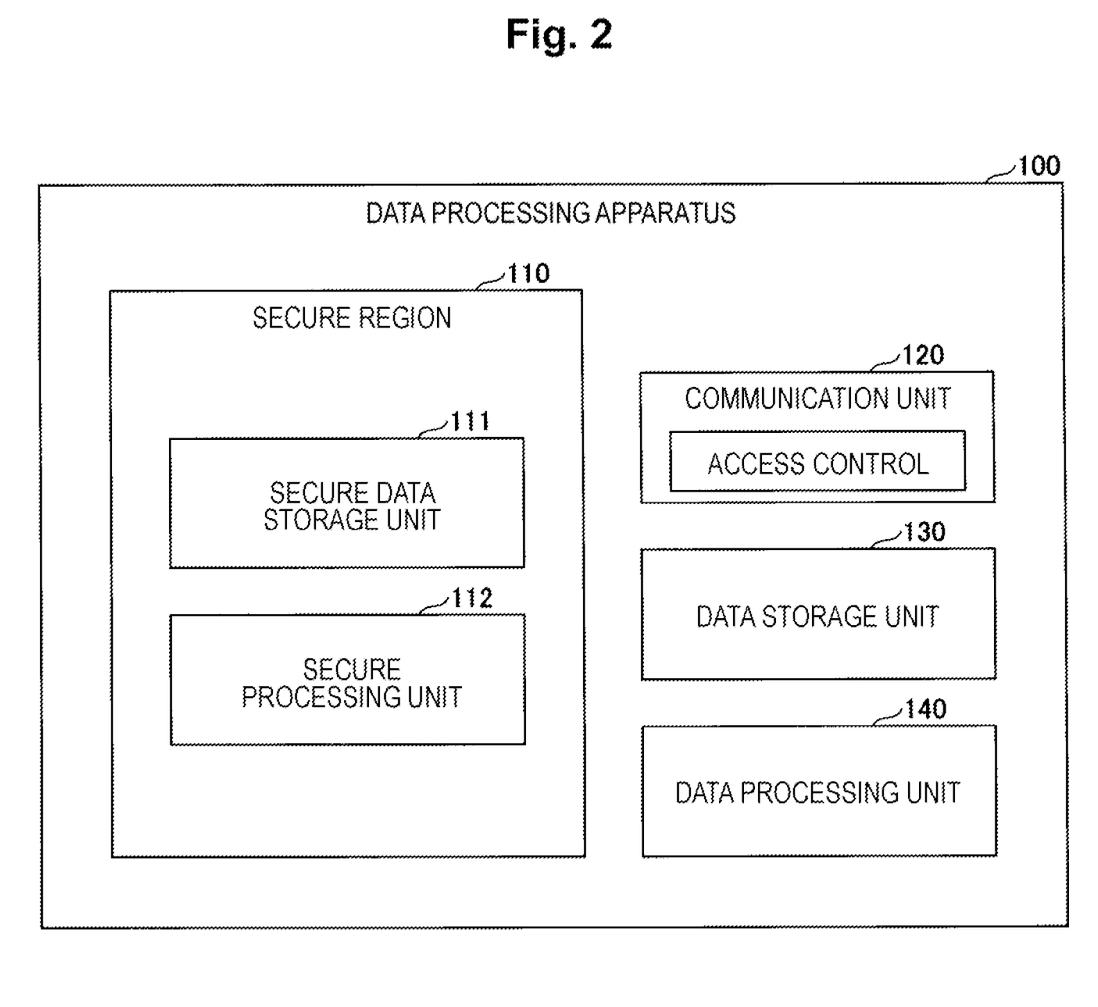
FIG. 2 is a functional configuration diagram of a data processing apparatus.

FIG. 2 illustrates an example functional configuration of the data processing apparatus 100. As illustrated in FIG. 2, the data processing apparatus 100 includes a secure region 110, a communication unit 120, a data storage unit 130, and a data processing unit 140.

The secure region 110 is a protected region in which confidentiality is maintained, and the contents of data and programs therein cannot be known to the outside. Outside the secure region 110, conventional data storing, data processing (program execution), and transmission/reception can be performed. Access control can also be performed by the communication unit 120.

In the secure region 110, it is possible to perform data storing and data processing (program execution) while maintaining confidentiality. FIG. 2 illustrates a secure data storage unit 111 and a secure processing unit 112 as functional units that perform these operations in the secure region 110.

The secure region 110 can be formed by an existing technique. Any technology may be used as an existing technique for forming the secure region 110. For example, the secure region 110 may be formed as a separate chip independent of the main CPU and the memory in terms of hardware, or the secure region 110 may be formed in terms of software by an encryption technique and an authentication technique. An example technique for forming the secure region 110 in terms of software is SGX described above. In the present embodiment, SGX is used as an example.

The secure region 110 may be called an Enclave. As described later, the secure region 110 in the present embodiment is activated (generated) by execution of a trusted application (TA) in the data processing apparatus 100.

Figure 3:
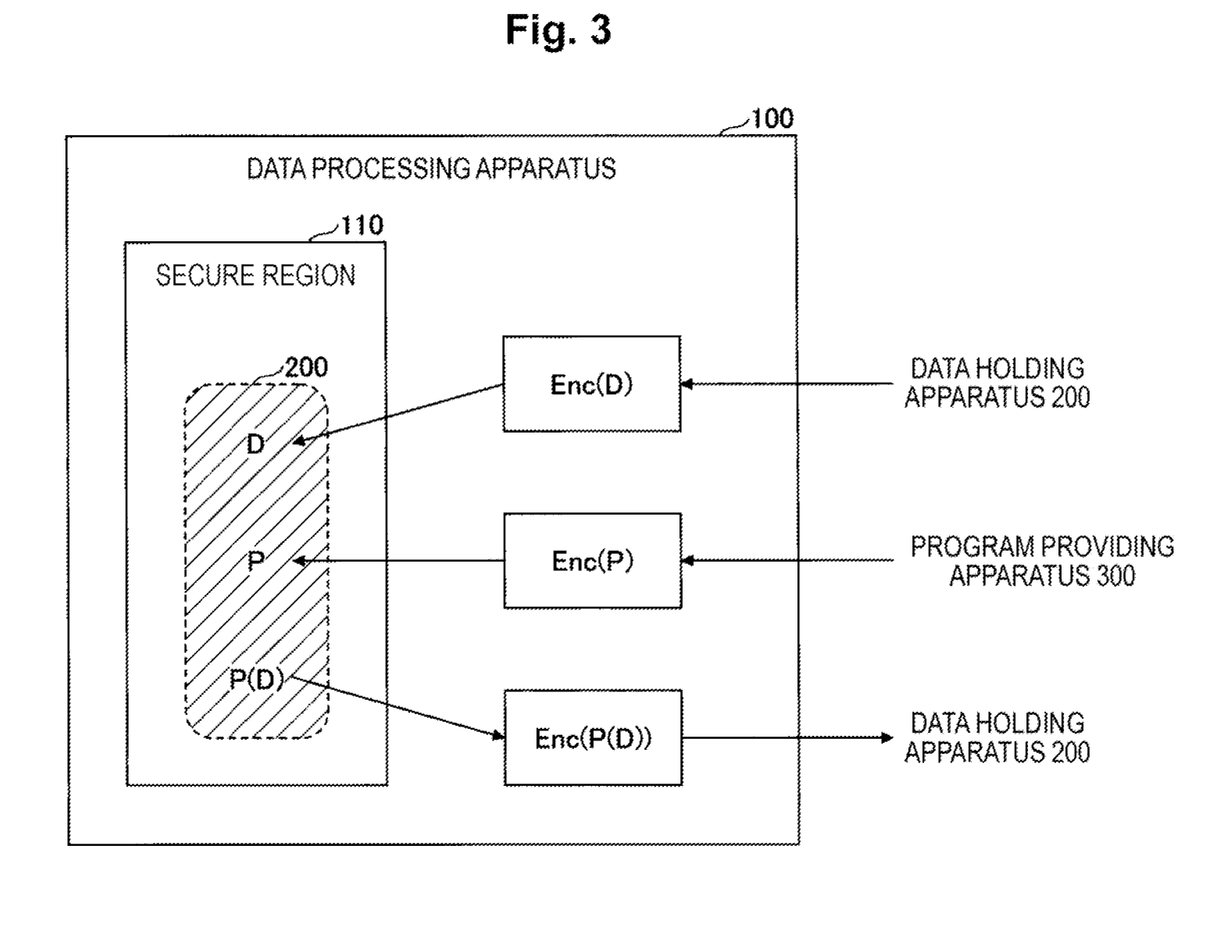
FIG. 3 is a diagram illustrating an image of processing in a secure region.

FIG. 3 illustrates an image of data processing in the secure region 110. Note that, in the present embodiment, "Enc" means encryption. For example, Enc(D) means encrypted data.

As illustrated in FIG. 3, the data processing apparatus 100 receives Enc(D) from the data holding apparatus 200, and Enc(P) from the program providing apparatus 300.

In the secure region 110, Enc(D) and Enc(P) are decrypted, so that D and P are obtained. Further, in the secure region 110, P(D) is computed, and Enc(P(D)) is further computed. Enc(P(D)) is transmitted to the data holding apparatus 200. In this manner, a mechanism in which the program P does not leak to the data holding apparatus 200, and the data D does not leak to the program providing apparatus 300 is formed by a combination of computing and encrypted communication in the secure region 110.

In the description below, Examples 1 to 3 are explained as example processing flows in the present embodiment. In each of the examples described below, a remote attestation mechanism is used in generating (sharing) a common key. More specifically, a protocol in which a mechanism for verifying the data processing apparatus 100 is inserted into the Elliptic Curve Diffie-Hellman Key Exchange (ECDHKE) protocol is used. In the present embodiment, this is referred to as the ECDHE with attestation.

In the verification of the data processing apparatus 100, a third party verification organization (Intel Attestation Service (IAS), for example) intervenes. However, the process of generating a common key with the third party verification organization's intervention is an existing technology remote attestation. Therefore, in the explanation of Examples 1 to 3, only an outline of the process related to remote attestation is described, and portions related to the present invention are described in detail.

In the description below, HA is a host application, and is a program such as a standard input-output program, for example. HA is a program that operates outside the secure region 110 in the data processing apparatus 100. PKp and SKp are a public key and a secret key of the program providing apparatus 300, respectively. PKd and SKd are a public key and a secret key of the data holding apparatus 200, respectively. Further, Enc(A, B) means information obtained by encrypting A with B (a key). H(A) means a hash value of A. Sig(H(A), B) means a signature for A by B (a secret key). MAC(A, B) is a message authentication code for A using B (a common key).

Example 1

Figure 4:
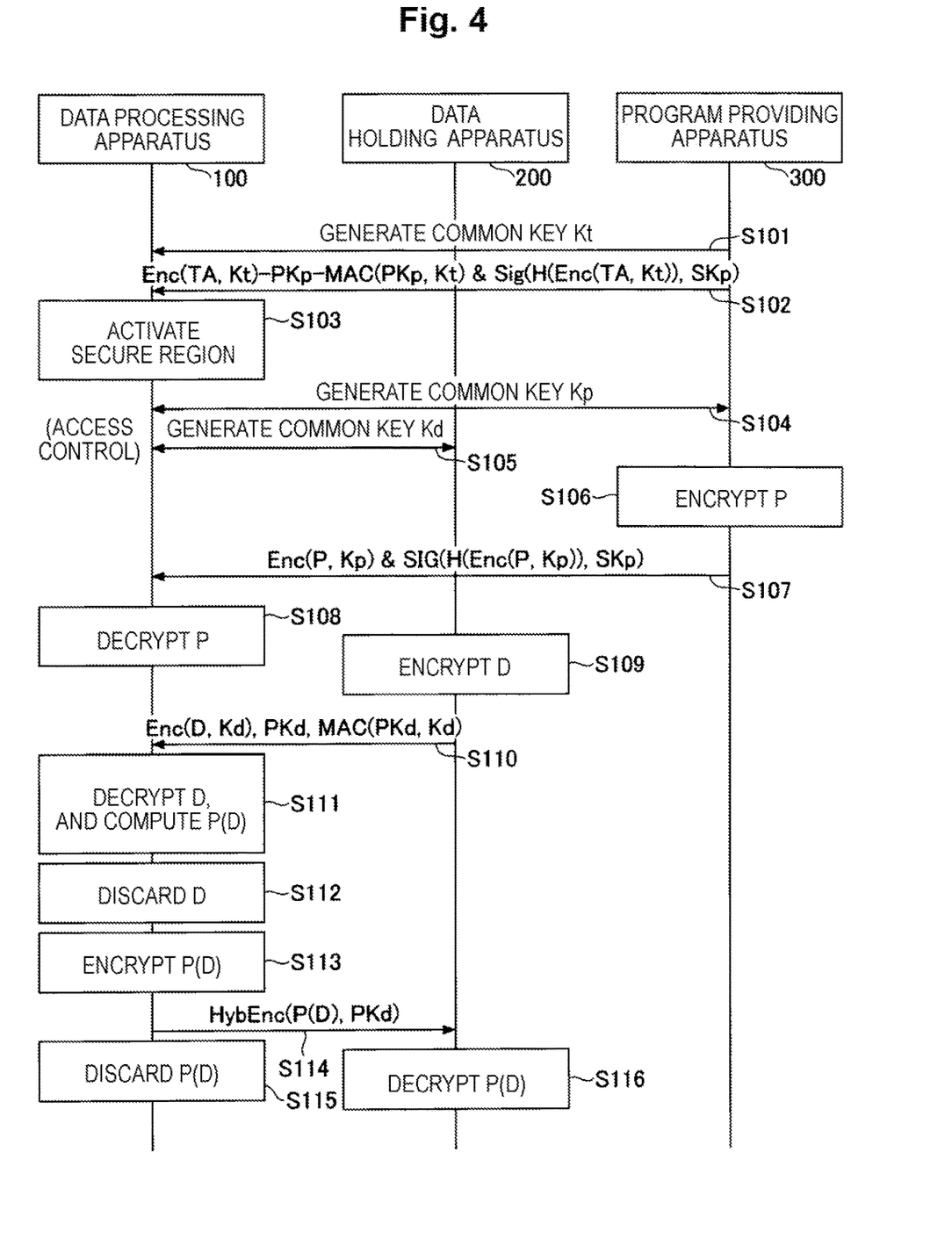
FIG. 4 is a sequence diagram illustrating processing in Example 1.

First, Example 1 is described with reference to FIG. 4. The processing flow in FIG. 4 is based on the assumption that the data holding apparatus 200 holds D, PKd, and SKd, and the program providing apparatus 300 holds HA, TA, P, PKp, and SKp. Note that the operating company of the data processing apparatus 100 may provide the program providing apparatus 300 with TA and HA in the format of SDK or in a library format in advance, so that P can be packaged together with TA and HA in the program providing apparatus 300.

Also, Example 1 is based on the assumption that the data processing apparatus 100 provides Web services to each user (the data holding apparatus 200 and the program providing apparatus 300), and user authentication (for each user) and server authentication (for the data processing apparatus 100) that are used in general Web services are performed.

In S101, the data processing apparatus 100 and the program providing apparatus 300 each generate (compute) a common key Kt by the ECDHE with attestation.

In S102, the program providing apparatus 300 transmits Enc(TA, Kt), PKp, MAC(PKp, Kt), and Sig(H(Enc(TA, Kt)), SKp) to the data processing apparatus 100.

The data processing apparatus 100 verifies the signature from the information received in S102, decrypts TA using Kt, and obtains PKp. In S103, the data processing apparatus 100 executes TA, to activate (generate) the secure region 110.

Note that the method by which the data processing apparatus 100 acquires PKp is not limited to the above method. For example, PKp may be obtained from an external trusted server that manages public keys.

In S104, the data processing apparatus 100 and the program providing apparatus 300 each generate and hold a common key Kp by the ECDHE with attestation. In the data processing apparatus 100, the common key Kp is generated in the secure region 110, and the common key Kp is held in the secure region 110.

In S105, the data processing apparatus 100 and the data holding apparatus 200 each generate and hold a common key Kd by the ECDHE with attestation. In the data processing apparatus 100, the common key Kd is generated in the secure region 110, and the common key Kd is held in the secure region 110.

Note that, at the time of S103, the data processing apparatus 100 has already verified the signature of the program providing apparatus 300, but has not yet verified the signature of the data holding apparatus 200. Therefore, before carrying out S105, the data processing apparatus 100 may perform access control to determine whether the secure region 110 can exchange keys with the data holding apparatus 200. For example, with the use of an access list including the data holding apparatus 200 permitted by the program providing apparatus 300, key exchange can be performed only with the data holding apparatus 200 permitted by the program providing apparatus 300.

In S106, the program providing apparatus 300 encrypts P with Kp. In S107, the program providing apparatus 300 transmits Enc(P, Kp) and SIG(H(Enc(P, Kp)), SKp) to the data processing apparatus 100.

In S108, the data processing apparatus 100 verifies the signature, decrypts P with Kp in the secure region 110, and holds P therein.

In S109, the data holding apparatus 200 encrypts D with Kd. In S110, the data holding apparatus 200 transmits Enc(D, Kd), PKd, and MAC(PKd, Kd) to the data processing apparatus 100.

In S111, the data processing apparatus 100 verifies MAC, and decrypts D with Kd and computes P(D) in the secure region 110. The data processing apparatus 100 also holds PKd in the secure region 110.

In S112, the data processing apparatus 100 discards D held in the secure region 110. The timing of discarding may be immediately after the end of processing of D according to P. Like D, P may also be discarded.

In S113, the data processing apparatus 100 obtains HybEnc(P(D), PKd) by encrypting P(D) held in the secure region 110 with the use of PKd.

In S114, the data processing apparatus 100 transmits HybEnc(P(D), PKd) to the data holding apparatus 200. In S115, the data processing apparatus 100 discards P(D). The timing of the discarding may be immediately after the generation of HybEnc(P(D), PKd), or immediately after the transmission of HybEnc(P(D), PKd). HybEnc(P(D), PKd) may be stored for audit, backup, or the like.

In S116, the data holding apparatus 200 decrypts P(D), using SKd. Thus, the data holding apparatus 200 can obtain P(D).

Note that, in the above example, P(D) is encrypted and decrypted on the public key basis, with the use of PKd and SKd. However, P(D) may be encrypted and decrypted with the use of Kd instead. That is, processing may be performed as follows.

In S113, the data processing apparatus 100 obtains Enc (P(D), Kd) by encrypting P(D) held in the secure region 110, with the use of Kd.

In S114, the data processing apparatus 100 transmits Enc(P(D), Kd) to the data holding apparatus 200. In S115, the data processing apparatus 100 discards P(D). The timing of the discarding may be immediately after the generation of Enc(P(D), Kd), or immediately after the transmission of Enc(P(D), Kd). Enc(P(D), Kd) may be stored for audit, backup, or the like.

In S116, the data holding apparatus 200 decrypts P(D), using Kd. Thus, the data holding apparatus 200 can obtain P(D).

Note that, in the above processing flow, the communication unit 120 of the data processing apparatus 100 may block communication other than the communication by the secure region 110 related to P or D. Particularly, downloading communication with devices other than the data holding apparatus 200 may be blocked.

According to Example 1, it is possible to provide a result of execution of P(D) to the data holder (the data holding apparatus 200) without the program author (the program providing apparatus 300) knowing D and P(D), while P and D are kept secret from the data processing apparatus 100, and P is kept secret from the data holder (the data holding apparatus 200), mainly from the viewpoint of the program author (the program providing apparatus 300.

Example 2

Figure 5:
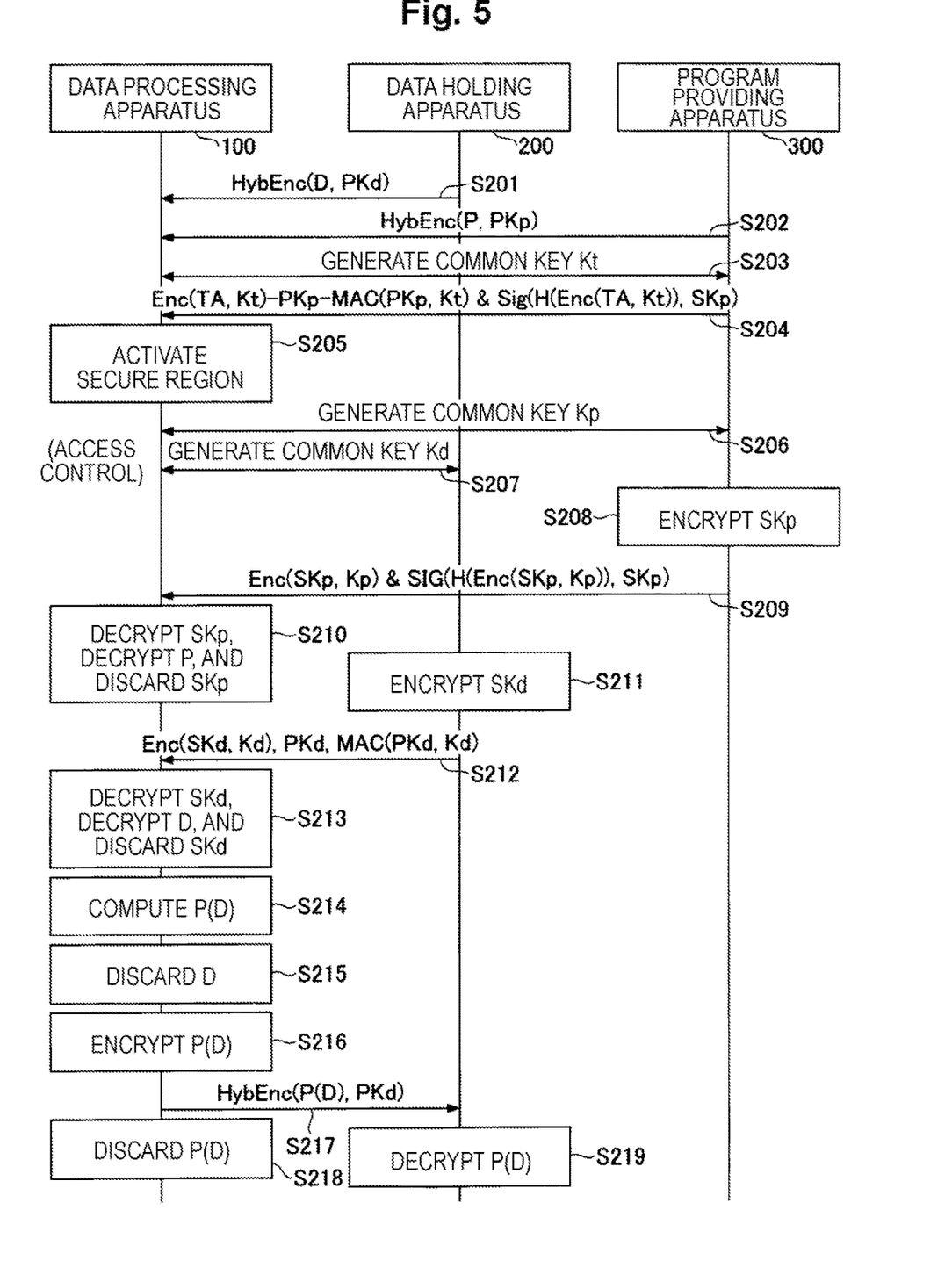
FIG. 5 is a sequence diagram illustrating processing in Example 2.

Next, Example 2 is described with reference to FIG. 5. The processing flow in FIG. 5 is based on the assumption that the data holding apparatus 200 holds D, PKd, and SKd, and the program providing apparatus 300 holds HA, TA, P, PKp, and SKp. Note that the operating company of the data processing apparatus 100 may provide the program providing apparatus 300 with TA and HA in the format of SDK or in a library format in advance, so that P can be packaged together with TA and HA in the program providing apparatus 300.

Also, Example 2 is based on the assumption that the data processing apparatus 100 provides Web services to each user (the data holding apparatus 200 and the program providing apparatus 300), and user authentication (for each user) and server authentication (for the data processing apparatus 100) that are used in general Web services are performed.

In S201, the data holding apparatus 200 transmits HybEnc (D, PKd) obtained by encrypting D with PKd, to the data processing apparatus 100. In S202, the program providing apparatus 300 transmits HybEnc(P, PKp) obtained by encrypting P with PKp, to the data processing apparatus 100.

HybEnc(D, PKd) and HybEnc(P, PKp) are both stored in a storage (the data storage unit 130 located outside the secure region 110) of the data processing apparatus 100. Note that HybEnc(D, PKd) and HybEnc(P, PKp) may be stored into the data processing apparatus 100 offline.

In S203, the data processing apparatus 100 and the program providing apparatus 300 each generate (compute) a common key Kt by the ECDHE with attestation.

In S204, the program providing apparatus 300 transmits Enc(TA, Kt), PKp, MAC(PKp, Kt), and Sig(H(Enc(TA, Kt)), SKp) to the data processing apparatus 100.

The data processing apparatus 100 obtains PKp from the information received in S204, and decrypts TA with the use of Kt. In S205, the data processing apparatus 100 executes TA, to activate (generate) the secure region 110.

Note that the method by which the data processing apparatus 100 acquires PKp is not limited to the above method. For example, PKp may be obtained from an external trusted server that manages public keys.

In S206, the data processing apparatus 100 and the program providing apparatus 300 each generate and hold a common key Kp by the ECDHE with attestation. In the data processing apparatus 100, the common key Kp is generated in the secure region 110, and the common key Kp is held in the secure region 110.

In S207, the data processing apparatus 100 and the data holding apparatus 200 each generate and hold a common key Kd by the ECDHE with attestation. In the data processing apparatus 100, the common key Kd is generated in the secure region 110, and the common key Kd is held in the secure region 110.

Note that, at the time of S205, the data processing apparatus 100 has already verified the signature of the program providing apparatus 300, but has not yet verified the signature of the data holding apparatus 200. Therefore, before carrying out S207, the data processing apparatus 100 may perform access control to determine whether the secure region 110 can exchange keys with the data holding apparatus 200. For example, with the use of an access list including the data holding apparatus 200 permitted by the program providing apparatus 300, key exchange can be performed only with the data holding apparatus 200 permitted by the program providing apparatus 300.

In S208, the program providing apparatus 300 encrypts SKp with Kp. In S209, the program providing apparatus 300 transmits Enc(SKp, Kp) and SIG(H(Enc(SKp, Kp)), SKp) to the data processing apparatus 100.

In S210, the data processing apparatus 100 performs signature verification, and decrypts SKp with Kp and decrypts P from HybEnc(P, PKp) with SKp in the secure region 110. After completing the decryption using SKp, the data processing apparatus 100 discards SKp.

In S211, the data holding apparatus 200 encrypts SKd with Kd. In S212, the data holding apparatus 200 transmits Enc(SKd, Kd), PKd, and MAC(PKd, Kd) to the data processing apparatus 100.

In S213, the data processing apparatus 100 performs signature verification, and decrypts SKd with Kd and decrypts D from HybEnc(D, PKd) with SKd in the secure region 110. After completing the decryption using SKd, the data processing apparatus 100 discards SKd. Also, PKd is held in the secure region 110.

In S214, the data processing apparatus 100 computes P(D) in the secure region 110. In S215, the data processing apparatus 100 discards D held in the secure region 110. The timing of discarding may be immediately after the end of processing of D according to P. Also, P may be discarded like D.

In S216, the data processing apparatus 100 obtains HybEnc(P(D), PKd) by encrypting P(D) held in the secure region 110 with the use of PKd.

In S217, the data processing apparatus 100 transmits HybEnc(P(D), PKd) to the data holding apparatus 200. In S218, the data processing apparatus 100 discards P(D). The timing of the discarding may be immediately after the generation of HybEnc(P(D), PKd), or immediately after the transmission of HybEnc(P(D), PKd). HybEnc(P(D), PKd) may be stored for audit, backup, or the like.

In S219, the data holding apparatus 200 decrypts P(D), using SKd. Thus, the data holding apparatus 200 can obtain P(D).

Note that, in the above example, P(D) is encrypted and decrypted on the public key basis, with the use of PKd and SKd. However, P(D) may be encrypted and decrypted with the use of a common key (referred to as a second common key or Kd2 herein) shared by the data processing apparatus 100 and the data holding apparatus 200 instead. That is, processing may be performed as follows.

In S216, the data processing apparatus 100 obtains Enc (P(D), Kd2) by encrypting P(D) held in the secure region 110, with the use of Kd2.

In S217, the data processing apparatus 100 transmits Enc(P(D), Kd2) to the data holding apparatus 200. In S218, the data processing apparatus 100 discards P(D). The timing of the discarding may be immediately after the generation of Enc(P(D), Kd2), or immediately after the transmission of Enc(P(D), Kd2). Enc(P(D), Kd2) may be stored for audit, backup, or the like.

In S219, the data holding apparatus 200 decrypts P(D), using Kd2. Thus, the data holding apparatus 200 can obtain P(D).

Further, in the above example, D and P are encrypted with the use of public keys in S201 and S202. However, D and P may be encrypted with the use of common keys instead. That is, processing may be performed as follows.

In S201, the data holding apparatus 200 transmits Enc(D, Kd2) obtained by encrypting D with Kd2, to the data processing apparatus 100. In S202, the program providing apparatus 300 transmits Enc(P, Kp2) obtained by encrypting P with Kp2, to the data processing apparatus 100.

Enc(D, Kd2) and Enc(P, Kp2) are both stored in a storage (the data storage unit 130 located outside the secure region 110) of the data processing apparatus 100. Note that Enc(D, Kd2) and Enc(P, Kp2) may be stored into the data processing apparatus 100 offline.

In this case, it is not necessary to transmit a secret key/public key from the program providing apparatus 300/ the data holding apparatus 200 to the data processing apparatus 100. However, Kp2 is transmitted from the program providing apparatus 300 to the data processing apparatus 100 in a process similar to the process of transmitting and receiving SKp described in S208 to S210, and the data processing apparatus 100 acquires Kp2. Also, Kd2 is transmitted from the data holding apparatus 200 to the data processing apparatus 100 in a process similar to the process of transmitting and receiving SKd described in S211 to S213, and the data processing apparatus 100 acquires Kd2.

After the secure region is activated in S205, the data processing apparatus 100 decrypts D with Kd2, and decrypts P with Kp2. In S214, the data processing apparatus 100 computes P(D) in the secure region 110. In S215, the data processing apparatus 100 discards D held in the secure region 110. The timing of discarding may be immediately after the end of processing of D according to P. Also, P may be discarded like D.

In S216, the data processing apparatus 100 obtains Enc (P(D), Kd2) by encrypting P(D) held in the secure region 110, with the use of Kd2.

In S217, the data processing apparatus 100 transmits Enc(P(D), Kd2) to the data holding apparatus 200. In S218, the data processing apparatus 100 discards P(D). The timing of the discarding may be immediately after the generation of Enc(P(D), Kd2), or immediately after the transmission of Enc(P(D), Kd2). Enc(P(D), Kd2) may be stored for audit, backup, or the like.

In S219, the data holding apparatus 200 decrypts P(D), using Kd2. Thus, the data holding apparatus 200 can obtain P(D).

Note that, in the above processing flow, the communication unit 120 of the data processing apparatus 100 may block communication other than the communication by the secure region 110 related to P or D. Particularly, downloading communication with devices other than the data holding apparatus 200 may be blocked.

According to Example 2, it is possible to provide a result of execution of P(D) to the data holder (the data holding apparatus 200) without the program author (the program providing apparatus 300) knowing D and P(D), while P and D are kept secret from the data processing apparatus 100, and P is kept secret from the data holder (the data holding apparatus 200), mainly from the viewpoint of the program author (the program providing apparatus 300, as in Example 1.

Also, according to Example 2, P and D are encrypted and stored into the data processing apparatus 100 in advance. Accordingly, it is possible to perform desired data processing using P and D simply by sending small-size keys (SKp and SKd) to the data processing apparatus 100. Thus, even in a case where the sizes of the program P and the data D are large, a user's waiting time such as an upload time does not increase.

Further, a cloud storage in a cloud assumed as an example of a specific embodiment form of the data processing apparatus 100 can be used as the storage for the encrypted P and D. Thus, services according to Example 2 can be easily provided to a user who is using the cloud storage.

Example 3

Figure 6:
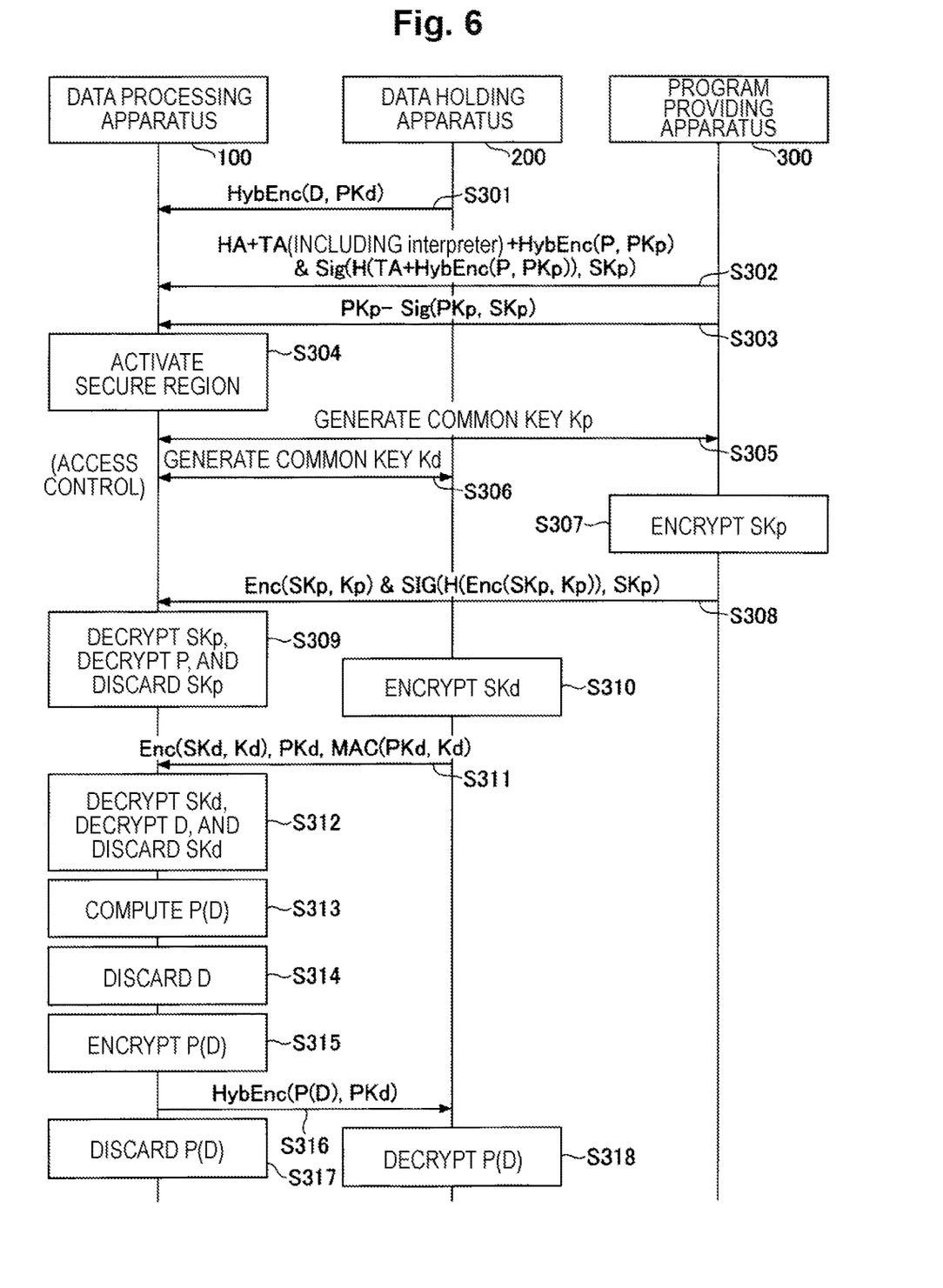
FIG. 6 is a sequence diagram illustrating processing in Example 3.

Next, Example 3 is described with reference to FIG. 6. The processing flow in FIG. 6 is based on the assumption that the data holding apparatus 200 holds D, PKd, and SKd, and the program providing apparatus 300 holds HA, TA, P, PKp, and SKp. Note that the operating company of the data processing apparatus 100 may provide the program providing apparatus 300 with TA and HA in the format of SDK or in a library format in advance, so that P can be packaged together with TA and HA in the program providing apparatus 300.

Also, Example 3 is based on the assumption that the data processing apparatus 100 provides Web services to each user (the data holding apparatus 200 and the program providing apparatus 300), and user authentication (for each user) and server authentication (for the data processing apparatus 100) that are used in general Web services are performed.

In S301, the data holding apparatus 200 transmits HybEnc (D, PKd) obtained by encrypting D with PKd, to the data processing apparatus 100. In S302, the program providing apparatus 300 transmits, to the data processing apparatus 100, "HA+TA (including interpreter)+HybEnc(P, PKp) & Sig(H(TA+HybEnc(P, PKp)), SKp)", which is a signature with HA, TA including an interpreter, HybEnc(P, PKp) obtained by encrypting P with PKp, and SKp.

HybEnc(D, PKd) and "HA+TA (including interpreter)+HybEnc(P, PKp) & Sig(H(TA+HybEnc(P, PKp)), SKp)" are stored in a storage (the data storage unit 130 located outside the secure region 110) of the data processing apparatus 100. Note that HybEnc(D, PKd) and "HA+TA (including interpreter)+HybEnc(P, PKp) & Sig(H (TA+HybEnc(P, PKp)), SKp)" may be stored into the data processing apparatus 100 offline.

Here, the above-mentioned interpreter is described. In Example 3, TA (including interpreter) and HybEnc(P, PKp) are formed as a set. Therefore, a set of P in an encrypted state and the interpreter included in TA is fixed to the secure region 110 at the time of activation (initialization) of the secure region 110 by TA (including interpreter). As described later, P is decrypted with SKp in the secure region 110, is interpreted by the interpreter, and is executed.

The technique using the interpreter in the secure region may be a technique for inserting a program into a secure region after the secure region is activated. However, by this technique, there is a possibility that an unauthorized program is inserted and executed. On the other hand, by the technique according to Example 3, only the encrypted P forming a set with TA (including interpreter) is decrypted, interpreted, and executed. Thus, it is possible to eliminate the possibility of execution of an unauthorized program.

In S303, the program providing apparatus 300 transmits PKp and Sig(PKp, SKp) to the data processing apparatus 100.

From the information received in S303, the data processing apparatus 100 verifies the signature, and obtains PKp. In S304, the data processing apparatus 100 activates (generates) the secure region 110 by executing TA (including interpreter) stored in the storage. The interpreter is incorporated into the secure region 110. Further, the encrypted P is fixed.

Note that the method by which the data processing apparatus 100 acquires PKp is not limited to the above method. For example, PKp may be obtained from an external trusted server that manages public keys.

In S305, the data processing apparatus 100 and the program providing apparatus 300 each generate and hold a common key Kp by the ECDHE with attestation. In the data processing apparatus 100, the common key Kp is generated in the secure region 110, and the common key Kp is held in the secure region 110.

In S306, the data processing apparatus 100 and the data holding apparatus 200 each generate and hold a common key Kd by the ECDHE with attestation. In the data processing apparatus 100, the common key Kd is generated in the secure region 110, and the common key Kd is held in the secure region 110.

Note that, at the time of S304, the data processing apparatus 100 has already verified the signature of the program providing apparatus 300, but has not yet verified the signature of the data holding apparatus 200. Therefore, before carrying out S306, the data processing apparatus 100 may perform access control to determine whether the secure region 110 can exchange keys with the data holding apparatus 200. For example, with the use of an access list including the data holding apparatus 200 permitted by the program providing apparatus 300, key exchange can be performed only with the data holding apparatus 200 permitted by the program providing apparatus 300.

In S307, the program providing apparatus 300 encrypts SKp with Kp. In S308, the program providing apparatus 300 transmits Enc(SKp, Kp) and SIG(H(Enc(SKp, Kp)), SKp) to the data processing apparatus 100.

In S309, the data processing apparatus 100 decrypts SKp with Kp and decrypts P from HybEnc(P, PKp) with SKp in the secure region 110. After completing the decryption using SKp, the data processing apparatus 100 discards SKp.

In S310, the data holding apparatus 200 encrypts SKd with Kd. In S311, the data holding apparatus 200 transmits Enc(SKd, Kd), PKd, and MAC(PKd, Kd) to the data processing apparatus 100.

In S312, the data processing apparatus 100 verifies MAC, and decrypts SKd with Kd and decrypts D from HybEnc(D, PKd) with SKd in the secure region 110. After completing the decryption using SKd, the data processing apparatus 100 discards SKd. Also, PKd is held in the secure region 110.

In S313, the data processing apparatus 100 computes P(D) in the secure region 110. In S314, the data processing apparatus 100 discards D held in the secure region 110. The timing of discarding may be immediately after the end of processing of D according to P. Also, P may be discarded like D.

In S315, the data processing apparatus 100 obtains HybEnc(P(D), PKd) by encrypting P(D) held in the secure region 110 with the use of PKd.

In S316, the data processing apparatus 100 transmits HybEnc(P(D), PKd) to the data holding apparatus 200. In S317, the data processing apparatus 100 discards P(D). The timing of the discarding may be immediately after the generation of HybEnc(P(D), PKd), or immediately after the transmission of HybEnc(P(D), PKd). HybEnc(P(D), PKd) may be stored for audit, backup, or the like.

In S318, the data holding apparatus 200 decrypts P(D), using SKd. Thus, the data holding apparatus 200 can obtain P(D).

Note that, in the above example, P(D) is encrypted and decrypted on the public key basis, with the use of PKd and SKd. However, P(D) may be encrypted and decrypted with the use of a common key (referred to as a second common key or Kd2 herein) shared by the data processing apparatus 100 and the data holding apparatus 200 instead. That is, processing may be performed as follows.

In S315, the data processing apparatus 100 obtains Enc(P(D), Kd2) by encrypting P(D) held in the secure region 110, with the use of Kd2.

In S316, the data processing apparatus 100 transmits Enc(P(D), Kd2) to the data holding apparatus 200. In S317, the data processing apparatus 100 discards P(D). The timing of the discarding may be immediately after the generation of Enc(P(D), Kd2), or immediately after the transmission of Enc(P(D), Kd2). Enc(P(D), Kd2) may be stored for audit, backup, or the like.

In S318, the data holding apparatus 200 decrypts P(D), using Kd2. Thus, the data holding apparatus 200 can obtain P(D).

Further, in the above example, D and P are encrypted with the use of public keys in S301 and S302. However, D and P may be encrypted with the use of common keys instead. That is, processing may be performed as follows.

In S301, the data holding apparatus 200 transmits Enc(D, Kd2) obtained by encrypting D with Kd2, to the data processing apparatus 100. In S302, the program providing apparatus 300 transmits, to the data processing apparatus 100, "HA+TA (including interpreter)+Enc(P, Kp2)", which includes HA, TA including an interpreter, and Enc(P, Kp2) obtained by encrypting P with Kp2. Note that a signature may be attached to "HA+TA (including interpreter)+Enc(P, Kp2)".

Enc(D, Kd2) and "HA+TA (including interpreter)+Enc(P, Kp2)" are stored in a storage (the data storage unit 130 located outside the secure region 110) of the data processing apparatus 100. Note that Enc(D, Kd2) and "HA+TA (including interpreter)+Enc(P, Kp2)" may be stored into the data processing apparatus 100 offline.

In this case, it is not necessary to transmit a secret key/public key from the program providing apparatus 300/ the data holding apparatus 200 to the data processing apparatus 100. However, Kp2 is transmitted from the program providing apparatus 300 to the data processing apparatus 100 in a process similar to the process of transmitting and receiving SKp described in S307 to S309, and the data processing apparatus 100 acquires Kp2. Also, Kd2 is transmitted from the data holding apparatus 200 to the data processing apparatus 100 in a process similar to the process of transmitting and receiving SKd described in S310 to S312, and the data processing apparatus 100 acquires Kd2.

After the secure region is activated in S304, the data processing apparatus 100 decrypts D with Kd2, and decrypts P with Kp2. In S313, the data processing apparatus 100 computes P(D) in the secure region 110. In S314, the data processing apparatus 100 discards D held in the secure region 110. The timing of discarding may be immediately after the end of processing of D according to P. Also, P may be discarded like D.

In S315, the data processing apparatus 100 obtains Enc(P(D), Kd2) by encrypting P(D) held in the secure region 110, with the use of Kd2.

In S316, the data processing apparatus 100 transmits Enc(P(D), Kd2) to the data holding apparatus 200. In S317, the data processing apparatus 100 discards P(D). The timing of the discarding may be immediately after the generation of Enc(P(D), Kd2), or immediately after the transmission of Enc(P(D), Kd2). Enc(P(D), Kd2) may be stored for audit, backup, or the like.

In S318, the data holding apparatus 200 decrypts P(D), using Kd2. Thus, the data holding apparatus 200 can obtain P(D).

Note that, in the above processing flow, the communication unit 120 of the data processing apparatus 100 may block communication other than the communication by the secure region 110 related to P or D. Particularly, downloading communication with devices other than the data holding apparatus 200 may be blocked.

According to Example 3, it is possible to provide a result of execution of P(D) to the data holder (the data holding apparatus 200) without the program author (the program providing apparatus 300) knowing D and P(D), while P and D are kept secret from the data processing apparatus 100, and P is kept secret from the data holder (the data holding apparatus 200), mainly from the viewpoint of the program author (the program providing apparatus 300, as in Example 1.

Also, according to Example 3, P and D are encrypted and stored into the data processing apparatus 100 in advance, as in Example 2. Accordingly, it is possible to perform desired data processing simply by sending small-size keys (SKp and SKd) to the data processing apparatus 100. Thus, even in a case where the sizes of the program P and the data D are large, a user's waiting time such as an upload time does not increase.

Further, a cloud storage in a cloud assumed as an example of a specific embodiment form of the data processing apparatus 100 can be used as the storage for the encrypted P and D. Thus, services according to Example 3 can be easily provided to a user who is using the cloud storage.

Also, an interpreter in the secure region may have a configuration in which a program is inserted later so as to increase the degree of freedom of the program in the secure region. However, in this configuration, there is a high possibility that an unauthorized program is inserted and executed in the secure region.

By the technique according to Example 3, on the other hand, P created by the program provider at will can be fixed within the secure region 110 at the time of activation of the secure region 110. Accordingly, it is possible to lower the possibility of later insertion of an unauthorized program, while maintaining the degree of freedom of the program.

Example Hardware Configuration

It is possible to implement all of the data processing apparatus 100, the data holding apparatus 200, and the program providing apparatus 300, by causing a computer to execute a program, for example. This computer may be a physical computer, or may be a virtual machine in a cloud. The data processing apparatus 100, the data holding apparatus 200, and the program providing apparatus 300 are collectively referred to as an "apparatus".

Specifically, the apparatus can be implemented by executing a program corresponding to the processing to be performed in the apparatus, using hardware resources such as a CPU and a memory installed in the computer. The above program can be recorded in a computer-readable recording medium (such as a portable memory), and be stored or distributed. Further, the above program can also be provided through a network such as the Internet or electronic mail.

Figure 7:
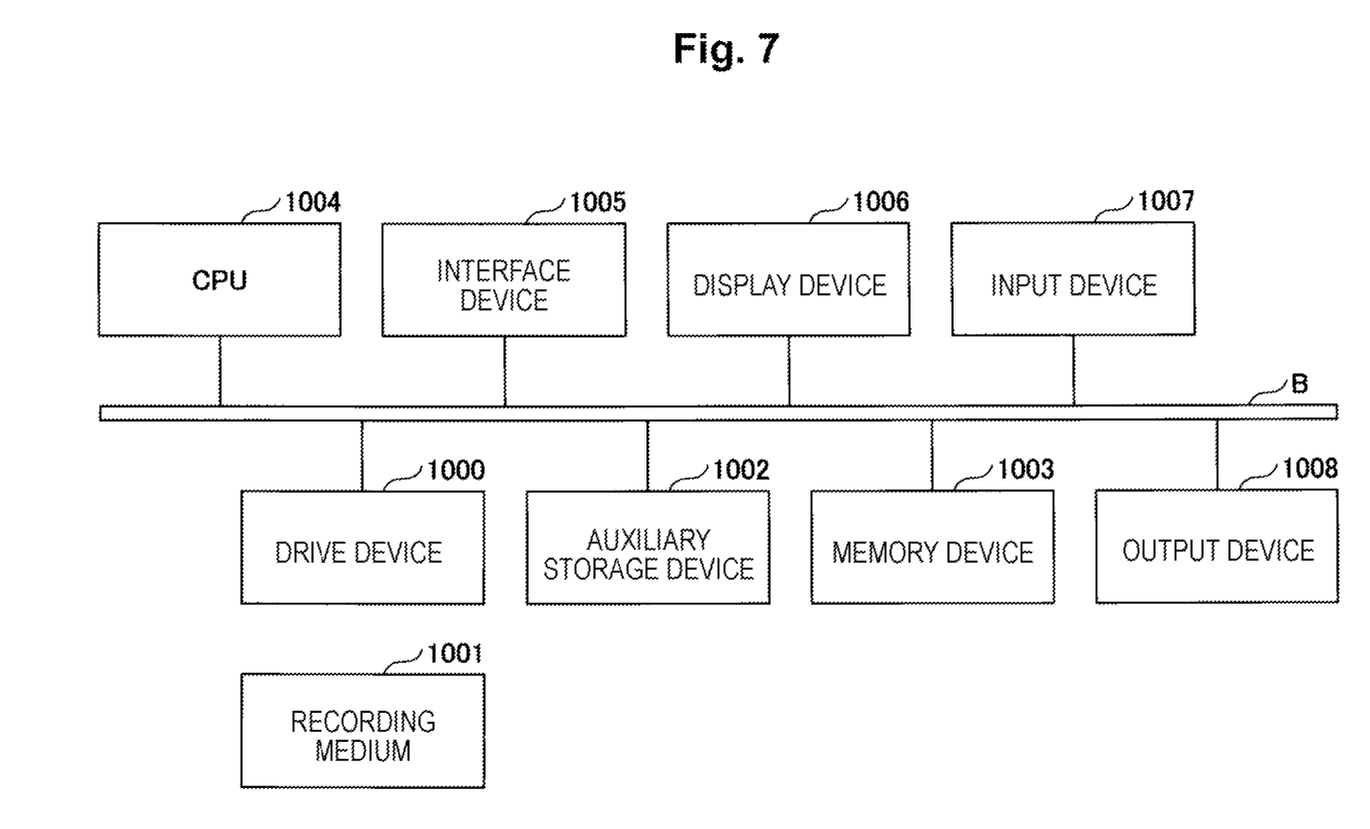
FIG. 7 is a diagram illustrating an example hardware configuration of an apparatus.

FIG. 7 is a diagram illustrating an example hardware configuration of the above computer. The computer in FIG. 7 includes a drive device 1000, an auxiliary storage device 1002, a memory device 1003, a CPU 1004, an interface device 1005, a display device 1006, an input device 1007, and an output device 1008, which are connected to one another by a bus BS. Note that some of these devices are not necessarily included. For example, in a case where display is not to be performed, the display device 1006 may not be included.

The program for performing the processing in the computer is provided through a recording medium 1001 such as a CD-ROM or a memory card, for example. When the recording medium 1001 storing the program is set in the drive device 1000, the program is installed from the recording medium 1001 into the auxiliary storage device 1002 via the drive device 1000. However, the program is not necessarily installed from the recording medium 1001, and may be downloaded from another computer via a network. The auxiliary storage device 1002 stores the installed program, and also stores necessary files, data, and the like.

In a case where an instruction to start the program is issued, the memory device 1003 reads the program from the auxiliary storage device 1002, and stores the program. The CPU 1004 implements a function related to the apparatus in accordance with a program stored in the memory device 1003. The interface device 1005 is used as an interface for connecting to a network, and functions as a transmission unit and a reception unit. The display device 1006 displays a graphical user interface (GUI) or the like according to the program. The input device 1007 includes a keyboard and mouse, buttons, a touch panel, or the like, and is used to input various operation instructions. The output device 1008 outputs an arithmetic operation result.

Example Application Fields

The technology described in the present embodiment can be applied to various use cases. Examples of use cases can be listed as below.

Traffic flow simulator
   (http://www.jste.or.jp/sim/models/index.html)
Human flow simulator (https://info.hitachi-ics.co.jp/product/h_flow/)
Heart simulator
   (https://blog.global.fujitsu.com/jp/2018-05-10/01/)
Brain simulator (https://bicr.atr.jp/cbi/research-ja/%E8%84% B3% E6% B4% BB % E5%8B %95% E8A8%88% E6% B8% AC % E3%83%87% E3%83% BC % E3%82% BF % E3%82% B7% E3%83%9F % E3%83% A5% E3%83% AC % E3%83% BC % E3%82% BF/)
Material physical properties simulator (https://www.jsol-cae.com/product/material/jocta/)
Robot simulator (http://www.idec-fs.com/robodk/)
FPGA simulator
   (https://www.intel.co.jp/content/www/jp/ja/software/programm able/quartus-prime/model-sim.html)
Space simulator (http://www.astro.phys.s.chiba-u.ac.jp/netlab/astro/index2.html)
Virtual pet (https://www.discoverychannel.jp/0000007144/)
Speech synthesis (https://cloud.google.com/text-to-speech?hl=ja)

Effects of the Embodiment

As described so far, the technology according to the present embodiment provides a technology for preventing data leakage to the program provider and program leakage to the data holder in a case where a data processing apparatus having a confidential computing mechanism processes data held by the data holder according to a program provided by the program provider.

SUMMARY OF THE EMBODIMENT

The present specification discloses at least the program execution systems, the data processing apparatuses, the program execution method, and the program of the items described below.

(Item 1)

A program execution system including a data holding apparatus, a program providing apparatus, and a data processing apparatus having a mechanism that performs secret computing in a secure region,
  in which
  the data holding apparatus transmits encrypted data to the data processing apparatus, and the program providing apparatus transmits an encrypted program to the data processing apparatus, the encrypted data being encrypted with a first common key, the encrypted program being encrypted with a second common key,
  in the secure region, the data processing apparatus acquires data by decrypting the encrypted data with the first common key, acquires a program by decrypting the encrypted program with the second common key, executes the program for the data, and encrypts a result of the execution with a public key of the data holding apparatus or the first common key, the data processing apparatus transmits the encrypted result of the execution to the data holding apparatus, and the data holding apparatus acquires the result of the execution by decrypting the encrypted result of the execution with a secret key or the first common key.

(Item 2)

A program execution system including a data holding apparatus, a program providing apparatus, and a data processing apparatus having a mechanism that performs secret computing in a secure region, in which the data processing apparatus holds beforehand encrypted data encrypted with a first public key that is a public key of the data holding apparatus, and an encrypted program encrypted with a second public key that is a public key of the program providing apparatus, the data holding apparatus transmits an encrypted first secret key to the data processing apparatus, and the program providing apparatus transmits an encrypted second secret key to the data processing apparatus, the encrypted data being encrypted with a first common key, the encrypted program being encrypted with a second common key, in the secure region, the data processing apparatus acquires a first secret key by decrypting the encrypted first secret key with the first common key, acquires data by decrypting the encrypted data with the first secret key, acquires a second secret key by decrypting the encrypted second secret key with the second common key, acquires a program by decrypting the encrypted program with the second secret key, executes the program for the data, and encrypts a result of the execution with a public key of the data holding apparatus, the data processing apparatus transmits the encrypted result of the execution to the data holding apparatus, and the data holding apparatus acquires the result of the execution by decrypting the encrypted result of the execution, using a secret key.

(Item 3)

The program execution system according to item 2, in which the data processing apparatus executes an application including an interpreter, to activate the secure region including the encrypted program, and cause the interpreter to interpret the decrypted program.

(Item 4)

The program execution system according to any one of items 1 to 3, in which the data processing apparatus discards the data and the result of the execution after executing the program in the secure region.

(Item 5)

A data processing apparatus in a program execution system that includes a data holding apparatus, a program providing apparatus, and the data processing apparatus having a mechanism that performs secret computing in a secure region, the data processing apparatus including:

a reception unit that receives encrypted data encrypted with a first common key from the data holding apparatus, and receives an encrypted program encrypted with a second common key from the program providing apparatus;

a processing unit that acquires data by decrypting the encrypted data with the first common key, acquires a program by decrypting the encrypted program with the second common key, executes the program for the data, and encrypts a result of the execution with a public key of the data holding apparatus or the first common key in the secure region; and a transmission unit that transmits the encrypted result of the execution to the data holding apparatus.

(Item 6)

A data processing apparatus in a program execution system that includes a data holding apparatus, a program providing apparatus, and the data processing apparatus having a mechanism that performs secret computing in a secure region, the data processing apparatus including:

a storage unit that holds beforehand encrypted data encrypted with a first public key that is a public key of the data holding apparatus, and an encrypted program encrypted with a second public key that is a public key of the program providing apparatus;

a reception unit that receives an encrypted first secret key encrypted with a first common key from the data holding apparatus, and receives an encrypted second secret key encrypted with a second common key from the program providing apparatus;

a processing unit that acquires a first secret key by decrypting the encrypted first secret key with the first common key, acquires data by decrypting the encrypted data with the first secret key, acquires a second secret key by decrypting the encrypted second secret key with the second common key, acquires a program by decrypting the encrypted program with the second secret key, executes the program for the data, and encrypts a result of the execution with a public key of the data holding apparatus in the secure region; and a transmission unit that transmits the encrypted result of the execution to the data holding apparatus.

(Item 7)

A program execution method in a program execution system that includes a data holding apparatus, a program providing apparatus, and a data processing apparatus having a mechanism that performs secret computing in a secure region, the program execution method including:

causing the data holding apparatus to transmit encrypted data to the data processing apparatus and the program providing apparatus to transmit an encrypted program to the data processing apparatus, the encrypted data being encrypted with a first common key, the encrypted program being encrypted with a second common key, causing, in the secure region, the data processing apparatus to acquire data by decrypting the encrypted data with the first common key, acquire a program by decrypting the encrypted program with the second common key, execute the program for the data, and encrypt a result of the execution with a public key of the data holding apparatus or the first common key, causing the data processing apparatus to transmit the encrypted result of the execution to the data holding apparatus, and causing the data holding apparatus to acquire the result of the execution by decrypting the encrypted result of the execution with a secret key or the first common key.

(Item 8)

A program for causing a computer to function as each unit of the data processing apparatus according to item 5 or 6.

Although the present embodiment has been described so far, the present invention is not limited to such a specific embodiment, and various modifications and changes can be made to it within the scope of the present invention disclosed in the claims.

REFERENCE SIGNS LIST 100 data processing apparatus
200 data holding apparatus
300 program providing apparatus
110 secure region
111 secure data storage unit
112 secure processing unit
120 communication unit
130 data storage unit
140 data processing unit
1000 drive device
1001 recording medium
1002 auxiliary storage device
1003 memory device
1004 CPU
1005 interface device
1006 display device
1007 input device
1008 output device

The invention claimed is:

1. A program execution system comprising:
a data holding apparatus; a program providing apparatus; and a data processing apparatus having a mechanism that performs secret computing in a secure region, wherein
the data holding apparatus transmits encrypted data to the data processing apparatus, and the program providing apparatus transmits an encrypted program to the data processing apparatus, the encrypted data being encrypted with a first common key, the encrypted program being encrypted with a second common key,
in the secure region, the data processing apparatus acquires data by decrypting the encrypted data transmitted by the data holding apparatus with the first common key, acquires a program by decrypting the encrypted program transmitted by the program providing apparatus with the second common key, executes the program acquired by decrypting the encrypted program transmitted by the program providing apparatus for the data acquired by decrypting the encrypted data transmitted by the data holding apparatus, and encrypts a result of the execution with a public key of the data holding apparatus or the first common key,
the data processing apparatus transmits the encrypted result of the execution to the data holding apparatus, and
the data holding apparatus acquires the result of the execution by decrypting the encrypted result of the execution with a secret key or the first common key.

2. The program execution system according to claim 1, wherein
the data processing apparatus executes an application including an interpreter, to activate the secure region including the encrypted program, and cause the interpreter to interpret the decrypted program.

3. The program execution system according to claim 1, wherein the data processing apparatus discards the data and the result of the execution after executing the program in the secure region.

4. A data processing apparatus in a program execution system that includes a data holding apparatus, a program providing apparatus, and the data processing apparatus having a mechanism that performs secret computing in a secure region,
the data processing apparatus comprising:
a memory; and
a processor coupled to the memory and configured to
receive encrypted data encrypted with a first common key from the data holding apparatus, and receive an encrypted program encrypted with a second common key from the program providing apparatus;
acquire data by decrypting the encrypted data transmitted by the data holding apparatus with the first common key, acquire a program by decrypting the encrypted program transmitted by the program providing apparatus with the second common key, execute the program acquired by decrypting the encrypted program transmitted by the program providing apparatus for the data acquired by decrypting the encrypted data transmitted by the data holding apparatus, and encrypt a result of the execution with a public key of the data holding apparatus or the first common key in the secure region; and
transmit the encrypted result of the execution to the data holding apparatus.

5. A non-transitory computer-readable storage medium storing a program for causing a computer to function as the data processing apparatus according to claim 4.

6. A program execution method in a program execution system that includes a data holding apparatus, a program providing apparatus, and a data processing apparatus having a mechanism that performs secret computing in a secure region, the program execution method comprising:
causing the data holding apparatus to transmit encrypted data to the data processing apparatus and the program providing apparatus to transmit an encrypted program to the data processing apparatus, the encrypted data being encrypted with a first common key, the encrypted program being encrypted with a second common key,
causing, in the secure region, the data processing apparatus to acquire data by decrypting the encrypted data transmitted by the data holding apparatus with the first common key, acquire a program by decrypting the encrypted program acquired by decrypting the encrypted program transmitted by the program providing apparatus with the second common key, execute the program transmitted by the program providing apparatus for the data acquired by decrypting the encrypted data transmitted by the data holding apparatus, and encrypt a result of the execution with a public key of the data holding apparatus or the first common key,
causing the data processing apparatus to transmit the encrypted result of the execution to the data holding apparatus, and
causing the data holding apparatus to acquire the result of the execution by decrypting the encrypted result of the execution with a secret key or the first common key.

* * * * *